United States Patent
Kunimoto

(10) Patent No.: US 10,599,372 B2
(45) Date of Patent: Mar. 24, 2020

(54) MEDIUM STORING PROGRAM EXECUTABLE BY TERMINAL APPARATUS, DATA TRANSMITTING METHOD AND TERMINAL APPARATUS

(71) Applicant: BROTHER KOGYO KABUSHIKI KAISHA, Nagoya-shi, Aichi-ken (JP)

(72) Inventor: Shintaro Kunimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/288,388

(22) Filed: Feb. 28, 2019

(65) Prior Publication Data

US 2019/0272129 A1    Sep. 5, 2019

(30) Foreign Application Priority Data

Mar. 2, 2018    (JP) .................................. 2018-037268

(51) Int. Cl.
    *G06F 3/12*    (2006.01)
(52) U.S. Cl.
    CPC .......... *G06F 3/1225* (2013.01); *G06F 3/1204* (2013.01); *G06F 3/1292* (2013.01)
(58) Field of Classification Search
    CPC ..... G06F 3/1225; G06F 3/1204; G06F 3/1292
    USPC ...................................................... 358/1.13
    See application file for complete search history.

(56) References Cited

U.S. PATENT DOCUMENTS

| | | | | |
|---|---|---|---|---|
| 5,611,046 | A * | 3/1997 | Russell | G06F 13/128 358/1.16 |
| 7,373,106 | B2 * | 5/2008 | Ikeda | H04W 8/22 455/26.1 |
| 9,430,723 | B1 * | 8/2016 | Panda | G06F 3/12 |
| 2004/0010567 | A1 * | 1/2004 | Moyer | G06F 3/1222 709/219 |
| 2008/0040448 | A1 | 2/2008 | Azuma et al. | |
| 2008/0259398 | A1 * | 10/2008 | Osuka | B41J 3/4075 358/1.15 |
| 2009/0251730 | A1 * | 10/2009 | Yamaguchi | H04N 1/00204 358/1.15 |

(Continued)

FOREIGN PATENT DOCUMENTS

| JP | 2008046776 A | 2/2008 |
|---|---|---|
| JP | 2018014023 A | 1/2018 |

*Primary Examiner* — Allen H Nguyen
(74) *Attorney, Agent, or Firm* — Scully, Scott, Murphy & Presser, PC

(57) ABSTRACT

There is provided a non-transitory computer-readable medium storing programs executable by a processor of a terminal apparatus. The terminal apparatus is configured to transmit files to be executed by external apparatuses to the external apparatuses. The programs, when executed by the processor, causes the terminal apparatus to: transmit a first file, which is a firmware, to a predetermined external apparatus included in the external apparatuses; and in a case that a second file is to be transmitted to the predetermined external apparatus, transmit the second file to the predetermined external apparatus after transmittance of the first file to the predetermined external apparatus has been completed, the second file being different from the first file and indicating information which is usable at a time of execution of a function of the predetermined external apparatus.

12 Claims, 7 Drawing Sheets

(56) References Cited

U.S. PATENT DOCUMENTS

2015/0029546 A1* 1/2015 Nishizaki ................ G06F 8/65
                                                    358/1.15
2017/0090908 A1* 3/2017 Tian ..................... G06F 9/4403
2018/0210726 A1* 7/2018 Jun ....................... G06F 8/654

* cited by examiner

MEDIUM STORING PROGRAM EXECUTABLE BY TERMINAL APPARATUS, DATA TRANSMITTING METHOD AND TERMINAL APPARATUS

CROSS REFERENCE TO RELATED APPLICATION

The present application claims priority from Japanese Patent Application No. 2018-037268 filed on Mar. 2, 2018 the disclosure of which is incorporated herein by reference in its entirety.

BACKGROUND

Field of the Invention

The present disclosure relates to: a computer program executable by a computer provided on a terminal apparatus so as to transmit, from the terminal apparatus to an external apparatus, a software executable by the external apparatus; a data transmitting method; and a terminal apparatus.

Description of the Related Art

Conventionally, there is known a technique for transmitting, from a terminal apparatus to a function executing apparatus, a firmware file which is a firmware executable by the function executing apparatus to thereby update the firmware of the function executing apparatus (see Japanese Patent Application Laid-open No. 2018-14023).

SUMMARY

In this conventional technique, however, there is such a problem that when the firmware file is transmitted from the terminal apparatus to the function executing apparatus after transmitting a variety of kinds of setting file (for example, a communication setting file, a setting file for apparatus body, etc.) from the terminal apparatus to the function executing apparatus, information set in each of the variety of kinds of setting file might be cleared depending on the information of the transmitted firmware file (for example, in a case that a command for clearing the setting file(s) is included in the firmware file). Further, in order to address to such a problem, a user needs to find out or locate a firmware file or a variety of kinds of setting file which is suitable for or compatible to the function executing apparatus in a folder of the terminal apparatus, and the user needs to transmit the found file(s) in an appropriate order to the function executing apparatus, thus requiring considerable time and effort from the user.

The present disclosure has been made in view of the above-described situation, and an object of the present disclosure is to provide a medium storing a program executable by a terminal apparatus, a data transmitting method and a terminal apparatus in each of which, in a case of transmitting a firmware file from the terminal apparatus to an external apparatus, there is no such a fear that any information, usable when a function of the external apparatus is executed, might be cleared and in each of which any considerable time and effort is not required for the transmission.

According to a first aspect of the present disclosure, there is provided a non-transitory computer-readable medium storing programs executable by a processor of a terminal apparatus, the terminal apparatus being configured to transmit files to be executed by external apparatuses to the external apparatuses, the programs, when executed by the processor, causing the terminal apparatus to: transmit a first file, which is a firmware, to a predetermined external apparatus included in the external apparatuses; and in a case that a second file being different from the first file is to be transmitted to the predetermined external apparatus, transmit the second file to the predetermined external apparatus after transmittance of the first file to the predetermined external apparatus has been completed, the second file indicating information which is usable at a time of execution of a function of the predetermined external apparatus.

According to a second aspect of the present disclosure, there is provided a terminal apparatus configured to transmit files to be executed by external apparatuses to the external apparatuses, the terminal apparatus including a processor configured to control communication with the external apparatuses, wherein the processor is configured to: transmit a first file, which is a firmware, to a predetermined external apparatus included in the external apparatuses; and in a case that a second file being different from the first file is to be transmitted to the predetermined external apparatus, transmit the second file to the predetermined external apparatus after transmittance of the first file to the predetermined external apparatus has been completed, the second file indicating information which is usable at a time of execution of a function of the predetermined external apparatus.

According to a third aspect of the present disclosure, there is provided a data transmitting method executable by a processor of a terminal apparatus so as to transmit files to be executed by external apparatuses from the terminal apparatus to the external apparatuses, the method comprising: transmitting a first file, which is a firmware, to a predetermined external apparatus included in the plurality of external apparatuses; and in a case that a second file being different from the first file is to be transmitted to the predetermined external apparatus, transmitting the second file to the predetermined external apparatus after transmittance of the first file to the predetermined external apparatus has been completed, the second file indicating information which is usable at a time of execution of a function of the predetermined external apparatus.

According to the first to third aspects of the present disclosure, there is no such a fear that the information usable at the time of execution of the function of the predetermined external apparatus might be cleared, by transmitting the firmware file from the terminal apparatus to the predetermined external apparatus, after the information, usable at the time of execution of the function of the predetermined external apparatus has been transmitted to the predetermined external apparatus. In addition, since there is no need for the user to perform any selection regarding the files to be transmitted from the terminal apparatus to the predetermined external apparatus and/or to determine an order by which the files are to be transmitted, any considerable efforts would not be required in transmittance of the file(s).

By carrying out the present disclosure, it is possible to provide a medium storing a program executable by a terminal apparatus, a data transmitting method and a terminal apparatus in each of which, in a case of transmitting a firmware file from the terminal apparatus to an external apparatus, there is no such a fear that any information usable in a case of executing a function of the external apparatus might be cleared, and in each of which any considerable effort is not required for the transmission.

DESCRIPTION OF THE EMBODIMENTS

First Embodiment

<General Description of Communication Executed by Mobile Terminal>

Figure 1:
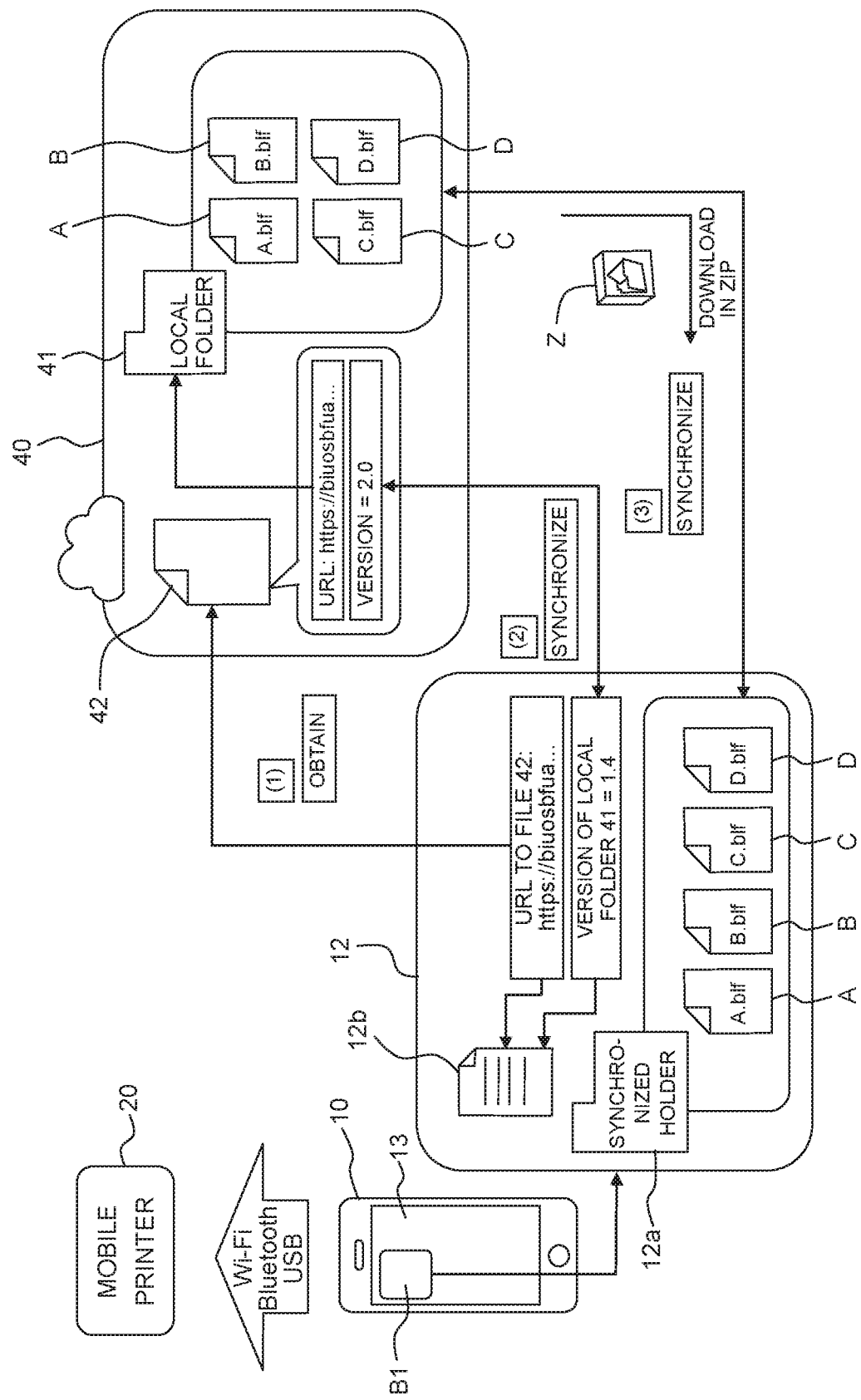
FIG. 1 is a schematic view of an embodiment of the present disclosure.

The outline of communication executed by a mobile terminal according to a first embodiment of the present disclosure will be explained as follows, with reference to FIG. 1. A mobile terminal 10 of the present embodiment is configured to be capable of performing communication (two-way communication) with a mobile printer 20. In the present embodiment, the mobile terminal 10 performs two-way communication with the mobile printer 20 by, for example, telecommunication standard such as a wireless LAN (Local Area Network) such as Wi-Fi (trade name by Wi-Fi Alliance), or Bluetooth (trade name), etc. Further, the mobile terminal 10 is configured to be capable of performing two-way communication with a server 40 via a telecommunication line. In the present embodiment, the Internet is used as the telecommunication line. The mobile terminal 10 is exemplified, for example, by a personal digital assistance (PDA) such as a tablet terminal, a smartphone (mobile phone equipped with the function of PDA), etc. Further, the mobile printer 20 is a portable printer.

The mobile printer 20 has a firmware such as a printer driver for performing printing on a print medium, etc., which is installed in the mobile printer 20. The firmware installed in the mobile printer 20 is provided and updated by the mobile printer 10 via the communication. A local folder 41 provided on the server 40 store therein files A to D such as a firmware file, a communication setting file, etc. These filed A to D are stored in the local folder 41 by, for example, an IT administrator of the server 40. In a file 42 set in the server 40, the URL and the version information of the local folder 41 are described, for example, in the JSON (JavaScript (trade name) Object Notation) format. In a file 12b stored in a memory 12 of the mobile terminal 10, the URL of the file 42 of the server 40 and the version information of the local folder 41 of the server 40 are described, for example, in the JSON format. Further, the memory 12 of the mobile terminal 10 stores therein a synchronized folder 12a which is synchronizable with the local folder 41 of the server 40. The synchronized folder 12a stores therein the files A to D such as a firmware file, the communication setting file, etc., downloaded from the local folder 41 of the server 40.

The mobile terminal 10 has an updater which is stored in the mobile terminal 10 and which is a software for updating the firmware, etc., of the mobile printer 20. In a case that a user selects an update button B1 displayed on a displaying section 13 of the mobile terminal 10, the updater is activated and starts to communicate with the server 40. Subsequently, the mobile terminal 10 downloads the version information described in the file 42; the mobile terminal 10 determines whether the downloaded version information matches (is coincident) with the version information described in the file 12b possessed by the mobile terminal 10. Next, in a case that the mobile terminal 10 determines that the downloaded version information does not match with the version information described in the file 12b of its own, the mobile terminal 10 accesses the local folder 41, of the server 40, which corresponds to the URL described in the file 12b, and downloads, to the synchronized folder 12a, the files A to D stored in the local folder 41. The files A to D are stored in a folder, is compressed, for example, by a Zip (trade name) format, etc., and is downloaded from the server 40 to the mobile terminal 10. In FIG. 1, a reference numeral Z indicates a compressed folder. The downloaded folder is decompressed in the synchronized folder 12a of the mobile terminal 10. Further, the version information described in the file 12b of the mobile terminal 10 is updated to the version information described in the file 42, every time the files A to D are downloaded from the server 40. By activating the updater so as to communicate with the server 40 in such a manner, the mobile terminal 10 updates the firmware and/or the communication setting file, etc., used in the mobile printer 20.

<Main Electrical Configurations of Mobile Terminal and Mobile Printer>

Figure 2:
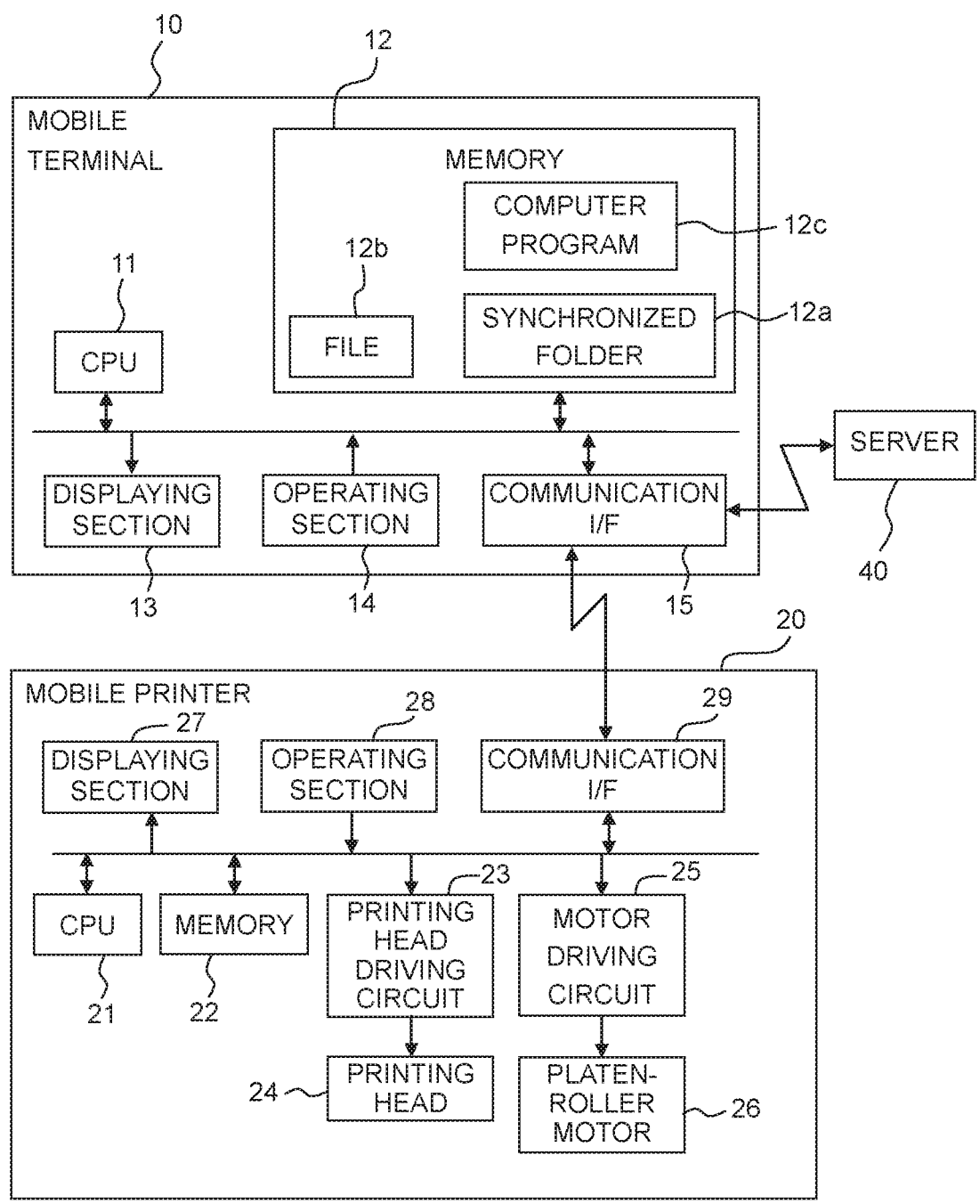
FIG. 2 is a block diagram explaining the main electrical configurations of a mobile (portable) terminal and a mobile printer.

Next, the main electrical configurations of the mobile terminal and the mobile printer of the present disclosure will be explained as follows, with reference to FIG. 2. The mobile terminal 10 is provided with constituent elements such as a CPU 11, the memory 12, the displaying section 13, an operating section 14, a communication interface (described as "communication I/F" in the drawings) 15, etc., and a communication bus 16. The respective constituent elements of the mobile terminal 10 are connected to one another electrically via the communication bus 16. The CPU 11 controls the entirety of the mobile terminal 10 by performing communication control between the mobile terminal 10 and the server 40, communication control between the mobile terminal 10 and the mobile printer 20, etc. The memory 12 is constructed of a ROM, a RAM, a flash ROM, etc. The memory 12 stores therein a computer program 12c for allowing the CPU 11 to function as a computer. The computer program includes a communication control program for communicating with the server 40, a communication control program for communicating with the mobile printer 20, etc. The communication control program for communicating with the server 40 includes the updater for updating the firmware which is to be executed by the mobile printer 20. Further, the memory 12 stores therein, for example, a file which is downloaded from the server 40 and which indicates information usable at a time of executing a function of the mobile printer 20, etc.

In the present embodiment, the file which indicates the information usable at a time of executing a function of the mobile printer 20 is exemplified, for example, by a communication setting file, a setting file for apparatus body (body setting file), a template setting file, a font setting file, a paper (paper sheet) size setting file, etc. The communication setting file includes the information which are set therein; the set information includes information regarding an IP address, a subnet mask, an IP address of a DHCP server for performing communication such as the wireless LAN communication such as Wi-Fi (trade name) or a wired LAN communication; information regarding ON or OFF of the LAN communication function; information regarding ON or OFF of the Bluetooth communication function; etc. The body setting file includes the information which are set therein; the set information includes information regarding the operation of the mobile printer 20, such as an electric power setting, a print setting, etc.; information for performing setting, for example, of the displaying section 27 of the printer 10; etc. The template setting file and the font setting file have information which is set therein and which is usable for causing a text data transmitted from the mobile terminal 10 to be reflected on an object of a printing layout stored in the mobile printer 20. The paper size setting file includes information which is set therein and which is usable for making a certain sheet size, not set in the printer driver of the mobile printer 20, to be added such that the certain sheet size is settable in the mobile printer 20. In the following, the above-described files each indicating the information usable at the time of executing the function of the mobile printer 20 are referred to as the variety of kinds of setting files. Note that the mobile printer 20 is an example of an "external apparatus" of the present disclosure, and that the mobile terminal 10 is an example of a "terminal apparatus" of the present disclosure. Further, the CPU 11 is an example of a "computer" of the present disclosure. Furthermore, the memory 12 is an example of a "predetermined storage area" of the present disclosure. Moreover, the firmware is an example of a "first file" of the present disclosure, and the variety of kinds of setting files is an example of a "second file" of the present disclosure.

The displaying section 13 is constructed, for example, of a liquid crystal displaying panel or an organic electroluminescence (EL) panel, etc. The operating section 14 is constructed, for example, of a touch sensor provided on a surface of the displaying section 13, an operating switch provided on, for example, on a side surface of the mobile terminal 10, etc. The displaying section 13 displays an operating state of the mobile terminal 10, a result of processing by the CPU 11, a communication state with the server 40, a communication state with the mobile printer 20, a variety of kinds of icon for activating a software such as the updater, etc. The communication interface 15 is a circuit for allowing the mobile terminal 10 to communicate with the mobile printer 20 and with the server 40.

The mobile printer 20 is provided with a CPU 21, a memory 22, a printing head driving circuit 23, a printing head 24, a motor driving circuit 25, a motor for platen roller (platen roller-motor) 26, a displaying section 27, an operating section 28, a communication interface (described as "communication I/F" in the drawings) 29, and a communication bus 30. The CPU 21, the memory 22, the printing head driving circuit 23, the motor driving circuit 25, the displaying section 27, the operating section 28 and the communication interface 29 are connected communicably to one other via the communication bus 30. The CPU 21 controls the entirety of the mobile printer 20 by performing printing control, paper (print medium) feeding control, communication control between the mobile printer 20 and the mobile terminal 10, etc. The memory 22 is constructed, for example, a ROM, a RAM, a flash ROM, etc. The memory 22 stores therein, for example, a firmware file such as a printer driver and a variety of kinds of setting file which allow the mobile printer 20 to function as a printer, etc.

In the present embodiment, the printing head 24 is a thermal head, and the printing head driving circuit 23 drives the printing head 24. The platen roller-motor 26 is a motor configured to drive and rotate a platen roller (not depicted in the drawings) which is arranged to face (to be opposite to) the printing head 24. The print medium such as print paper, a label, etc., is pinched between the printing head and the platen roller, and is fed or conveyed in a predetermined direction by the rotation of the platen roller. The motor driving circuit 25 controls the rotation of the platen roller-motor 26. The displaying section 27 is constructed, for example, of a power source indicating lamp indicating the ON/OFF state of the power source of the mobile printer 20, a state indicating lamp indicating the state of the mobile printer 20, a charge indicating lamp displaying the charge state of the mobile printer 20, a Wi-Fi indicating lamp indicating the Wi-Fi connection state of the mobile printer 20, and a Bluetooth indicating lamp indicating the Bluetooth connection state of the mobile printer 20, etc. The operating section 28 is constructed, for example, of a power button configured to switch ON and OFF the power source of the mobile printer 20, a feed button for feeding the paper (print medium), etc. The communication interface 29 is a circuit for allowing the mobile printer 20 to communicate with the mobile terminal 10.

<Update of Firmware>

Figure 3:
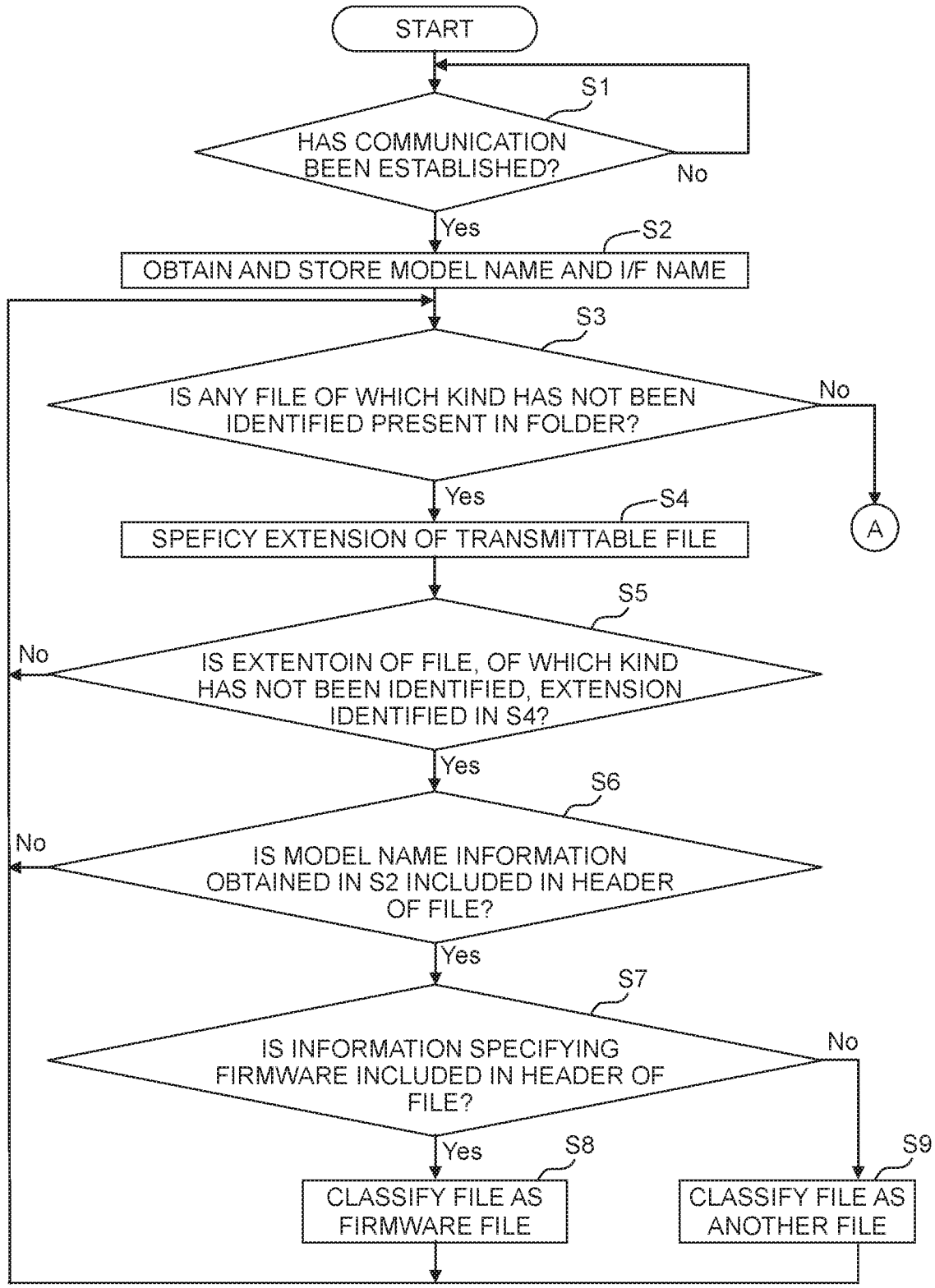
FIG. 3 is a flow chart depicting a main processing executed by a CPU of the mobile terminal.
Figure 4:
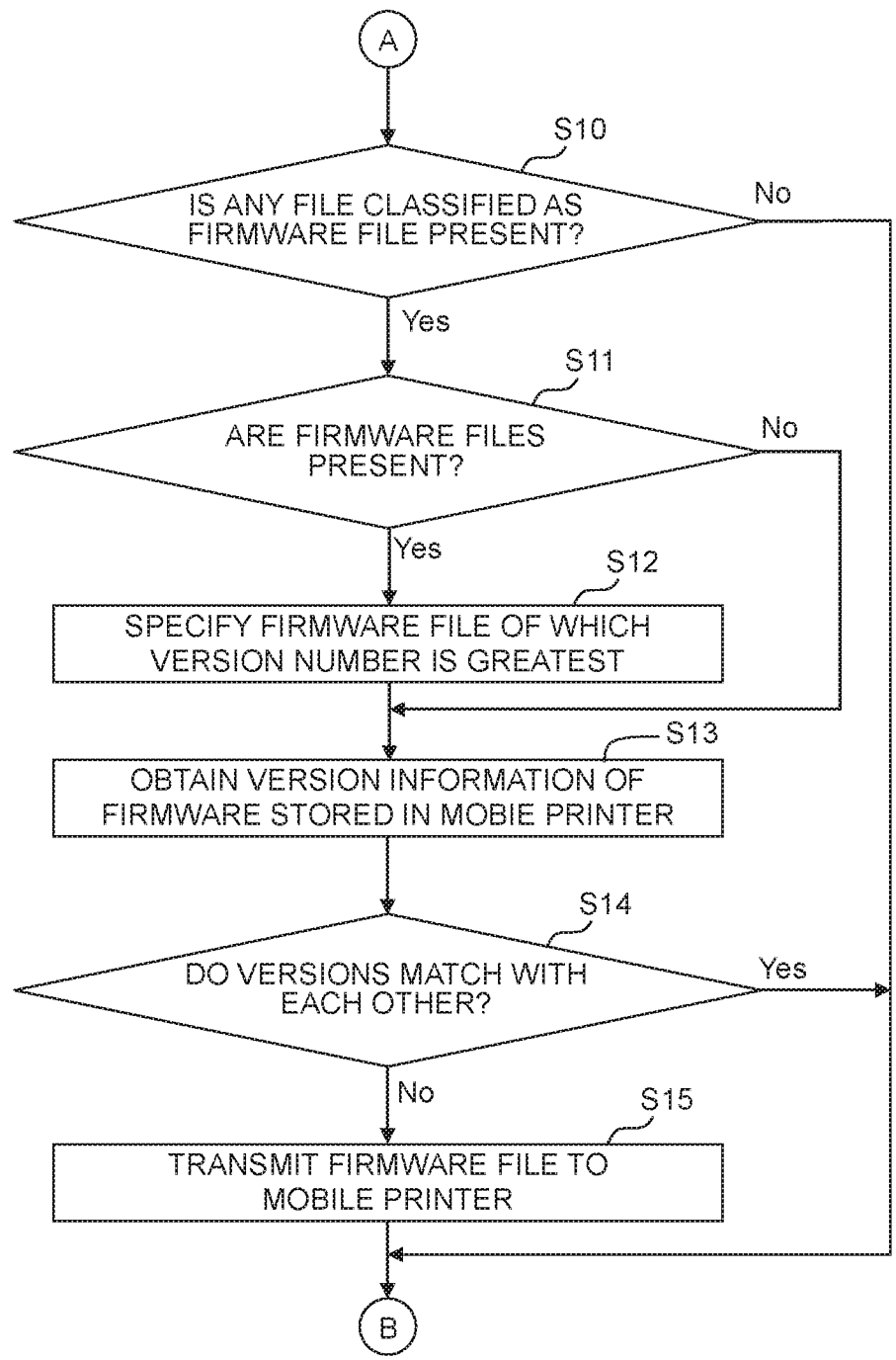
FIG. 4 is a flow chart depicting the continuation of the processing depicted in FIG. 3.
Figure 5:
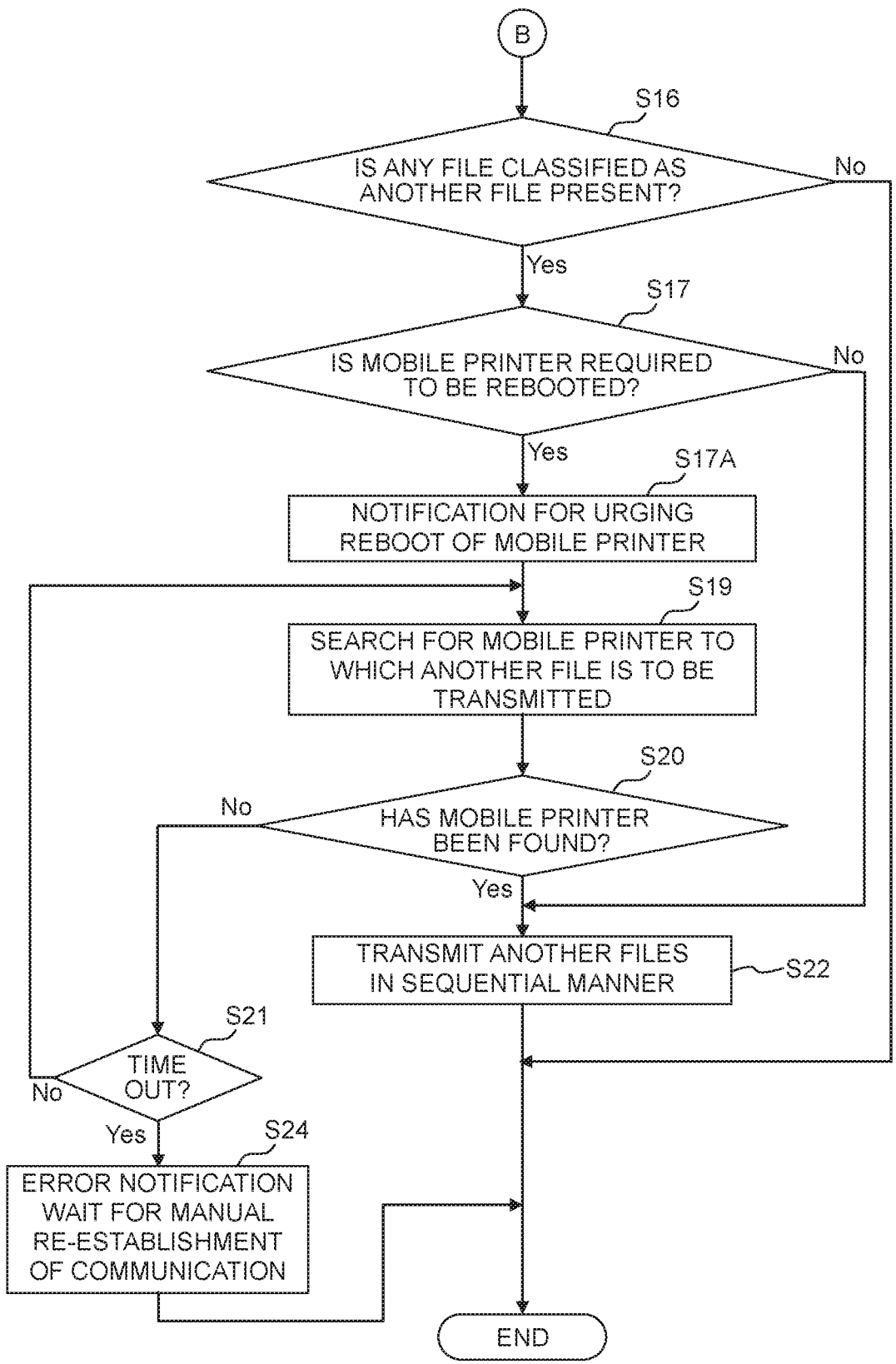
FIG. 5 is a flow chart depicting the continuation of the processing depicted in FIG. 4.

Next, a processing executed by the CPU 11 (see FIG. 2) of the mobile terminal 10 so as to update the firmware stored in the memory 22 (see FIG. 2) of the mobile printer 20 will be explained as follows, with reference to FIGS. 3 to 5. Here, it is presumed that the firmware, the variety of kinds of setting files, etc., downloaded from the server 40 (see FIG. 1) are stored in the synchronized folder 12a (see FIG. 2) of the memory 12 of the terminal apparatus 10. Further, it is presumed that the mobile terminal 10 and the mobile printer 20 communicate with each other via the Bluetooth, with the mobile terminal 10 as the master and the mobile printer 20 as the slave.

The CPU 11 determines whether the communication with the mobile printer 20 is established (Step 1 (hereinafter "step" is abbreviated as "S") of FIG. 3); in a case that the CPU 11 determines that the communication with the mobile printer 20 is established (S1: YES), the CPU 11 obtains, from the mobile printer 20, model name information indicating the model name of the mobile printer 20 and interface information indicating the name of communication interface, and stores these two kinds of information in the memory 12 (S2). Subsequently, the CPU 11 determines whether any file, of which kind has not been specified (identified), is present in files stored in the synchronized folder 12a (FIG. 2) (S3). Namely, the CPU 11 determines whether there is any file for which the determination, as to whether the file is the firmware or not, has not been performed is present (S3). Here, in a case that the CPU 11 determines that a file, of which kind has not been identified, is present in the files stored in the synchronized folder 12a (S3: YES), the CPU 11 identifies the extension of a file transmittable from the mobile terminal 10 to the mobile printer 20, based on the model name information and the communication interface information stored in the memory 12 in S2 (S4). Subsequently, the CPU 11 determines whether the extension, of the file, of which kind has been determined as not being identified in S3, is the extension identified in S4 (S5).

For example, in a case that ".blf" is identified as the extension of the file in S4, the CPU 11 determines whether the extension, of the file, of which kind has been determined as not being identified in S3, is the extension ".blf" (S5). In the example indicated in FIG. 1, since the extension of the file A stored in the synchronized folder 12a is ".blf", the CPU 11 determines that the file A is a file transmittable to the mobile printer 20. In a case that the CPU 11 determines that the extension of the file of which kind has been determined as not being identified in step S3 is the extension identified in step S4 (S5: YES), the CPU 11 determines whether a header of the file includes the model name information stored in the memory 12 in step S2 (S6). In a case that the CPU 11 determines that the header includes the model name information stored in the memory 12 in step S2 (S6: YES), the CPU 11 determines whether any information identifying the firmware is included in the header of the file (S7). For example, the CPU 11 determines whether a character string identifying the firmware (for example, "FP-MAIN") is included in the header of the file (S7). In a case that the CPU 11 determines that information specifying the firmware is included in the header of the file (S7: YES), the CPU 11 classifies the file as the object of determination as a firmware file (S8). On the other hand, in a case that the CPU 11 determines that information specifying the firmware is not included in the header of the file (S7: NO), the CPU 11 classifies the file as another file which is different from the firmware (the variety of kinds of setting file, etc.) (S9). Note that the "another file which is different from the firmware" is also referred simply to as the "another file", in some cases. Note that a file which is determined as the object of a negative determination in step S5 or S6 (S5: NO or S6: NO), such file does not become the object of the determination in step S3.

The CPU 11 repeats the above-described steps S3 to S9 until the CPU 11 determines in step S3 that any file, of which kind has not been specified (identified), is present in the files stored in the synchronized folder 12a. Then, in a case that the CPU 11 determines that any file, of which kind has not been specified (identified) in step S3, is not present in files stored in the synchronized folder 12a (S3: NO), the CPU 11 determines whether any file, of which kind has been categorized as the firmware file, is present (step S10 in FIG. 4); in a case that the CPU 11 determines that there is a file, of which kind has been categorized as the firmware file, is present (S10: YES), the CPU 11 determines whether a plurality of firmware files are present (S11). In a case that the CPU 11 determines that a plurality of firmware files are present (S11: YES), the CPU 11 reads the version information from the plurality of firmware files, and specifies a firmware file, included in the plurality of firmware files and of which version number is the greatest (S12). Subsequently, the CPU 11 obtains the version information of the firmware stored in the mobile printer 20, by means of communication with the mobile printer 20 (S13), and the CPU 11 determines whether the version specified in step S12 matches with the version information obtained from the mobile printer 20 in step S13. (step S14).

Here, in a case that the CPU 11 determines that the version specified in step S12 and the version obtained in step S13 do not match with each other (S14: NO), it is necessary to update the firmware file. Thus, the CPU 11 transmits the firmware file having the version specified in step S12 to the mobile printer 20 (S15). On the other hand, in a case that the CPU 11 determines that a plurality of firmware files are not present (S11: NO), the CPU 11 allows the procedure to skip to step S13, and obtains the version information of the firmware stored in the mobile printer 20. Subsequently, the CPU 11 determines whether any file classified by the CPU 11 as the another file is present (S16 in FIG. 15); in a case that the CPU 11 determines that any file, classified by the CPU 11 as the another file, is present (S16: YES), the CPU 11 determines whether the mobile printer 20 is required to be rebooted (S17). Here, in a case that the firmware file has been transmitted to the mobile printer 20 in step S15 and that the CPU 11 determines in step S16 that any file, classified by the CPU 11 as the another file, is present (S16: YES), it is necessary that the another file is transmitted and is made to be in a usable state. In order to make the another file to be in a usable state, it is necessary that the mobile printer 20 is rebooted to thereby make the firmware to function. Thus, the CPU 11 determines that the mobile printer 20 is required to be rebooted (S17: YES). Further, in a case that the CPU 11 determines in step S10 that any file, classified by the CPU 11 as the firmware file, is not present (S10: NO); or in a case that the CPU 11 determines in step S14 that the version specified in step S12 and the version obtained in step S13 match with each other (S14: YES) and skips step S15, the CPU 11 does not transmit the firmware file to the mobile printer 20. Thus, the CPU 11 determines that the mobile printer 20 is not required to be rebooted (S17: NO).

Here, in a case that the CPU 11 determines that the mobile printer 20 is required to be rebooted (S17: YES), the CPU 11 performs notification for urging the reboot of the mobile printer 20 (517A). For example, the CPU 11 displays, on the displaying section 13, a message "Transmission of firmware is completed. Please reboot the mobile printer". With this, the user reboots the mobile printer 20 and thereby making it possible to allow the firmware to function. Subsequently, the CPU 11 searches for the mobile printer 20 to which the another file is to be transmitted (S19). The mobile printer 20 which has received the firmware file transmitted from the mobile terminal 10 is rebooted, which in turn shuts off (breaks) the communication between the mobile printer 20 and mobile terminal 10. Therefore, in a case that a plurality of pieces of the mobile printer 20 are present within a communicable range with the mobile terminal 10, it is necessary to search the mobile printer 20 to which the firmware file has been transmitted in step S15. Accordingly, the CPU 11 searches for the mobile printer 20 to which the another file is to be transmitted (S19). Subsequently, the CPU 11 determines whether the mobile printer 20 to which the another file is to be transmitted is found (S20); in a case that the CPU 11 determines that the mobile printer 20 to which the another file is to be transmitted (S19) is not found (S20: NO), the CPU 11 determines whether a time elapsed since the start of searching of the mobile printer 20 is timed out (S21). Here, in a case that the CPU 11 determines that the elapsed time is not timed out (S21: NO), the CPU 11 again searches the mobile printer 20 (S19). The time elapsed since the start of searching of the mobile printer 20 and until the time-out is set based on a time required since the receipt of the firmware file by the mobile printer 20 and until the reboot of the mobile printer 20.

The CPU 11 performs searching of the mobile printer 20 until the time-out (steps S19 to S21); in a case that the CPU 11 determines that the mobile printer 20 is found (S20: YES), the CPU 11 transmits the another file sequentially to the mobile printer 20 which has been found in step S20 (S22). Namely, the CPU 11 transmits, to the rebooted mobile printer 20, the another file in a sequential manner, under a condition that the communication with the rebooted mobile printer 20 is re-established (triggered by re-establishment of the communication with the rebooted mobile printer 20). Further, in a case that the CPU 11 determines that the time elapsed since the start of searching of the mobile printer 20 is timed out (S21: YES), the CPU 11 performs error notification notifying that the communication with the mobile printer 20 is shut off, the CPU 11 changes the state thereof into a waiting state in which the CPU 11 waits until the communication with the mobile printer 20 is re-established manually by the user (S24), and the CPU 11 completes this processing cycle. The error notification is performed, for example, by causing the displaying section 13 to display a message "Communication Error". Further, in a case that the CPU 11 determines in step S16 that any file, classified by the CPU 11 as the another file, is not present (S16: NO), the CPU 11 completes this processing cycle. Furthermore, in a case that the CPU 11 determines that in step S17 that the mobile printer 20 is not required to be rebooted (S17: NO), the CPU 11 transmits, to the mobile printer 20, the another file in a sequential manner (S22). Note that the computer program for allowing the CPU 11 to perform the steps S1 to S24 is an example of "programs" of the present disclosure, and is an example of a "data transmitting method" of the present disclosure. Further, the model name information is an example of an "identification data" of the present disclosure.

Effects of First Embodiment

According to the computer program executable by the CPU 11, the data transmitting method performed by the CPU 11 and the terminal apparatus 10 of the first embodiment as described above, it is possible to transmit the variety of kinds of setting files from the terminal apparatus 10 to the mobile printer 20, after the completion of transmittance of the firmware file from the terminal apparatus 10 to the mobile printer 20. Accordingly, there is not such a fear that the variety of kinds of setting files might be cleared due to the transmittance of the firmware file from the terminal apparatus 10 to the mobile printer 20 after the completion of transmittance of the variety of kinds of setting files from the terminal apparatus 10 to the mobile printer 20. Further, the CPU 11 selects the file(s) to be transmitted from the mobile terminal 10 to the mobile printer 20 and transmits the file(s) to the mobile printer 20 in a correct transmitting order. Thus, there is no need for the user to perform selection of the file(s) to be transmitted from the mobile terminal 10 to the mobile printer 20 and/or to determine an order by which the files to be transmitted. Accordingly, any considerable efforts would not be required for the user regarding the transmittance of the file(s).

Furthermore, it is possible to transmit the variety of kinds of setting files to the mobile printer 20, after the firmware file has been received by the mobile printer 20 and then the mobile printer 20 is rebooted. Namely, since it is possible to transmit the variety of kinds of setting files to the mobile printer 20 in which the firmware file has been updated, the firmware and the variety of kinds of setting files can be associated with each other. Namely, the variety of kinds of setting files are allowed to be in a usable state.

Moreover, it is possible to transmit the variety of kinds of setting files to the rebooted mobile printer 20, under a condition that the communication with the rebooted mobile printer 20 is re-established. Accordingly, it is possible to prevent any failure of transmitting the variety of kinds of setting files to the mobile printer 20.

Further, even in a case that there is a plurality of pieces of the mobile printer 20 communicable with the mobile terminal 10, the search is performed regarding the mobile printer 20 to which the variety of kinds of setting files are to be transmitted when the mobile printer 20 is rebooted, and the variety of kinds of setting files are transmitted to the searched mobile printer 20. Namely, it is possible to transmit the variety of kinds of setting files in an ensured manner to the mobile printer 20 to which the firmware has been transmitted.

By executing the computer program executable by the CPU 11, by executing the data transmitting method performed by the CPU 11 and by realizing the terminal apparatus 10 of the first embodiment as described above, there is no such a fear, in a case of transmitting the firmware from the mobile terminal 10 to the mobile printer 20, that any information which is used in a case of executing a function of the mobile printer 20 might be cleared and in each of which any considerable efforts is not required for the transmission.

Second Embodiment

Figure 6:
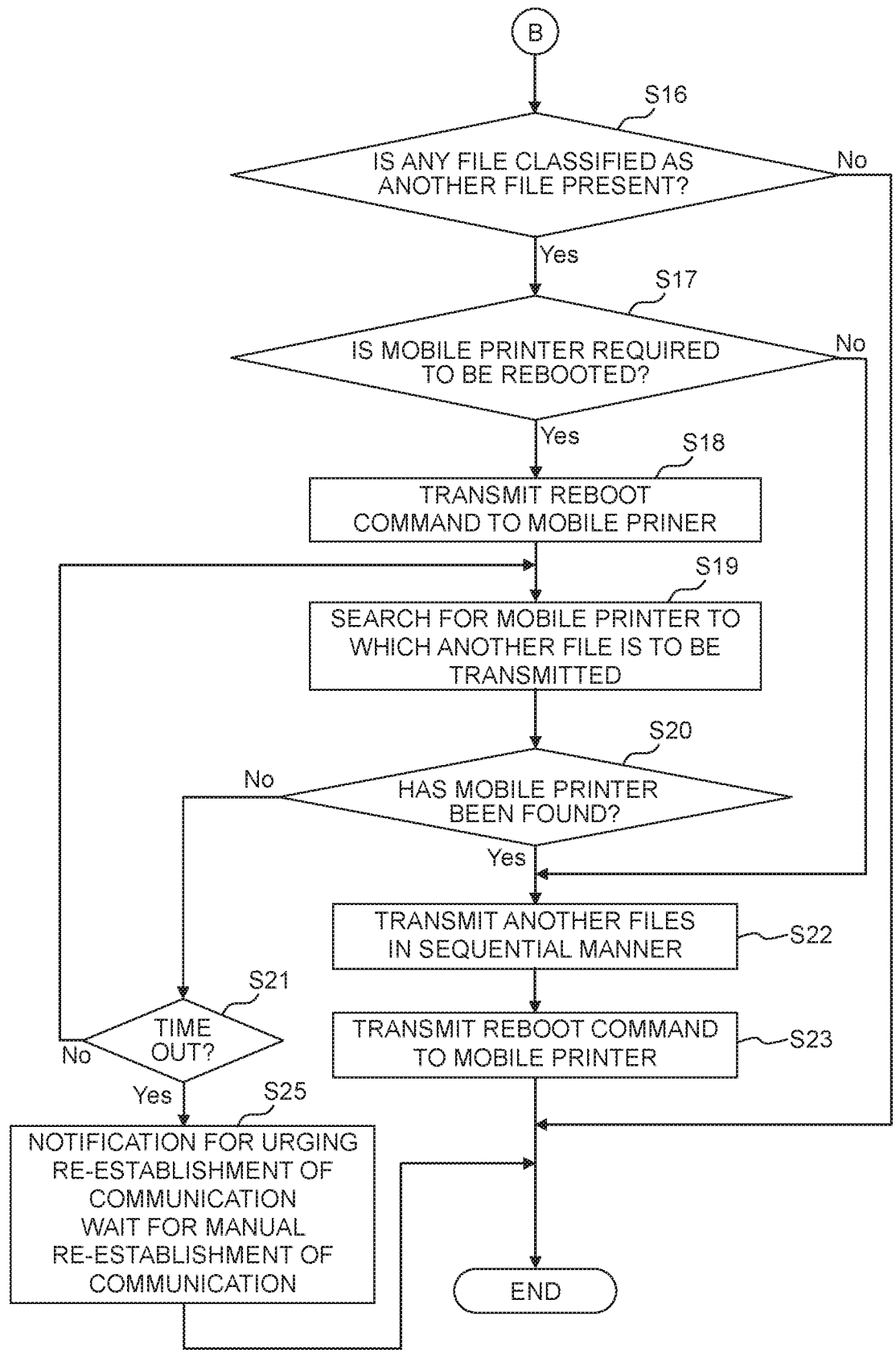
FIG. 6 is a flow chart depicting a main processing executed by a CPU of the mobile terminal, in a second embodiment of the present disclosure, with a part of the main processing being omitted.

Next, a second embodiment of the present disclosure will be explained with reference to FIGS. 6 and 7. Note that the explanation of the same configuration and function as those of the first embodiment will be omitted. Further, among the processings (procedures) executed by the CPU 11, the explanation of the procedures which are same as those in the first embodiment (steps S1 to S17 and S19 to S22) will be omitted or simplified. In a case that the CPU 11 determines that the mobile printer 20 is required to be rebooted (FIG. 6, S17: YES), the CPU 11 transmits a reboot command to the mobile printer 20 (S18). With this, the mobile printer 20 is rebooted, and is in a state of capable of executing the firmware. The CPU 11 transmits the variety of kinds of setting files in a sequential manner to the mobile printer 20 which has been found by the searching (S22), and then the CPU 11 transmits the reboot command to the mobile printer 20 (S23). With this, the mobile printer 20 is rebooted, the firmware and the variety of kinds of setting files are associated with each other, and the mobile printer 20 is allowed to be a state that the mobile printer 20 is capable of using the variety of kinds of setting files. Further, in a case that the CPU 11 determines that the time elapsed since the start of searching of the mobile printer 20 is timed out (S21: YES), the CPU 11 performs notification for urging the re-establishment of the communication with the mobile printer 20 and changes the state thereof into a waiting state in which the CPU 11 waits until the communication with the mobile printer 20 is re-established manually by the user (S25).

Figure 7:
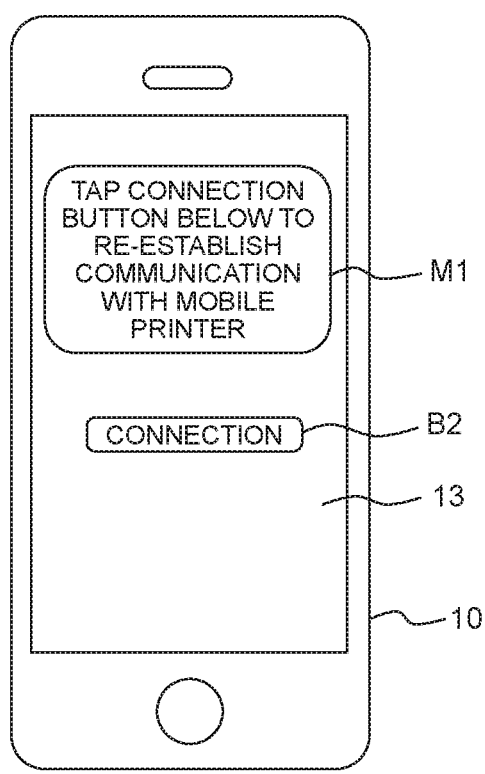
FIG. 7 is a view for explaining a display screen of the mobile terminal.

For example, as depicted in FIG. 7, the CPU 11 displays, on the displaying section 13 of the mobile terminal 10, a message image M1 urging the re-establishment of communication, and a connection button B2 for re-connection. In the example depicted in FIG. 17, a message image M1 indicating "Tap Connection Button Below To Re-establish Connection With Mobile Printer", and a connection button B2 indicating "Connection". In a case that the user taps the connection button B2, the communication with the mobile printer 20 is re-established. Further, in a case that any file categorized as the another file is not present (S16: NO), the CPU 11 does not perform the notification for urging the re-establishment of communication. Note that the displaying section 13 is an example of a "notifying section" of the present disclosure, and the reboot command is an example of a "reboot instruction" of the present disclosure.

[Effects of Second Embodiment]

By executing the computer program executable by the CPU 11, by executing the data transmitting method performed by the CPU 11 and by realizing the terminal apparatus 10 of the second embodiment as described above, it is possible to reboot the mobile printer 20 via the mobile terminal 10, thereby making it possible to eliminate the considerable efforts for the user regarding the rebooting of the mobile printer 20. Further, by allowing the mobile printer 20 to reboot, the firmware is updated, and the mobile printer 20 is allowed to be a state in which the firmware is executable.

Furthermore, since the mobile printer 20 can be rebooted after the transmission of the another file has been completed, it is possible to eliminate the efforts for the user regarding the rebooting of the mobile printer 20. Moreover, by rebooting the mobile printer 20, the another file is updated, and the firmware and the another file can be associated with each other. Further, it is also possible to make the mobile printer 20 in a state in which the mobile printer 20 is capable of using the another file.

Further, in a case that the communication between the mobile printer 20 and the mobile terminal 10 is cut off due to the rebooting of the mobile printer 20, the notification for urging the re-establishment of the communication with the mobile printer 20 is performed to thereby making it possible to urge the user to re-establish the communication.

Furthermore, in a case that any file categorized as the another file is not present, the CPU 11 does not perform the notification for urging the re-establishment of the communication with the mobile printer 20. Accordingly, it is possible to prevent the CPU 11 from executing any unnecessary processing.

Other Embodiments

Under a condition that the mobile printer 20 is rebooted after the firmware file has been transmitted from the mobile terminal 10 to the mobile printer 20 and that the communication between the mobile printer 20 and the mobile terminal 10 is been re-established, the computer program may make the mobile terminal 10 to be in such a state that the another file which is different from the firmware file is transmittable to the rebooted mobile printer 20 by an operation by the user. In this case, the user can choose whether to transmit the another file to the mobile printer 20.

The mobile terminal 10 may transmit, to the mobile printer 20, a computer program for rebooting the mobile printer 20 when installation of the firmware file is completed, together with the firmware file. In this case, it is possible for the CPU 11 to omit the processing of transmitting the reboot command after transmitting the firmware file to the mobile printer 20. Further, in a case that the program for rebooting the mobile printer 20 is included in the firmware in advance, there is no need to display the message for urging the reboot, and there is also no need to transmit the reboot command. It is also allowable to transmit, from the mobile terminal 10 to the mobile printer 20, the computer program for rebooting the mobile printer 20 when the installation of the another file is completed, together with the another file. In this case, it is possible for the CPU 11 to omit the processing of transmitting the reboot command after transmitting the another file to the mobile printer 20.

The mobile terminal 10 may be connected to the mobile printer 20 with a connecting cord, such as a USB cord, etc., and the mobile terminal 10 and the mobile printer 20 may communicate with each other via the connecting cord. The present disclosure is applicable to any apparatus provided that the apparatus is configured to receive a firmware file via communication with a terminal apparatus, and is configured to function by the received firmware. For example, the present disclosure is applicable to a non-portable type printer, a facsimile apparatus, a multi-function peripheral, a sewing machine, etc.

There is such a case that, among the files to be transmitted to the mobile printer 20, a setting for cutting off the communication with the mobile printer 20 is included in a file including the communication setting. In a case that the file including the communication setting is transmitted to the mobile printer 20 before transmitting a file which does not include the communication setting, there is such a fear that the communication with the mobile printer 20 might be cut off, due to which file not including the communication setting might not be transmitted. In view of such a fear, in a case that the file including the communication setting and the file not including the communication setting are present in the variety of kinds of setting file to be transmitted to the mobile printer 20, it is preferred to firstly transmit the file not including the communication setting and then to transmit the file including the communication setting. In this case, a computer program executable by a computer provided on a terminal apparatus can be expressed as a computer program of the following contents.

A non-transitory computer-readable medium storing programs executable by a processor of a terminal apparatus, the terminal apparatus being configured to transmit files to be executed by an external apparatus to the external apparatus, the programs, when executed by the processor, causing the terminal apparatus to:

in a case that files to be transmitted to the external apparatus include: a first file including a setting regarding communication with the terminal apparatus; and a second file not including the setting regarding communication with the terminal apparatus, transmit the second file to the external apparatus and then transmit the first file to the external apparatus, wherein the files indicate information usable at a time of execution of a function of the external apparatus.

What is claimed is:

1. A non-transitory computer-readable medium storing programs executable by a processor of a terminal apparatus, the terminal apparatus being configured to transmit files to be executed by external apparatuses to the external apparatuses, the programs, when executed by the processor, causing the terminal apparatus to:
   transmit a first file, which is a firmware, to a predetermined external apparatus included in the external apparatuses; and
   in a case that a second file being different from the first file is to be transmitted to the predetermined external apparatus, transmit the second file to the predetermined external apparatus after transmittance of the first file to the predetermined external apparatus has been completed, the second file indicating information which is usable at a time of execution of a function of the predetermined external apparatus.

2. The medium according to claim 1, wherein the programs cause the terminal apparatus to transmit the second file to the predetermined external apparatus after the predetermined external apparatus, in which receipt of the first file has been completed, is rebooted.

3. The medium according to claim 1, wherein the programs cause the terminal apparatus to transmit, to the predetermined external apparatus, a reboot instruction for rebooting the predetermined external apparatus, after the transmittance of the first file to the predetermined external apparatus has been completed.

4. The medium according to claim 2, wherein the terminal apparatus further includes a notifying section configured to execute notification for urging re-establishment of communication with the predetermined external apparatus which is rebooted; and in a case that the communication with the predetermined external apparatus which is rebooted is not re-established, the programs cause the notifying section of the terminal apparatus to execute the notification.

5. The medium according to claim 4, wherein in a case that the second file to be transmitted to the rebooted predetermined external apparatus is absent, the programs do not cause the notifying section of the terminal apparatus to execute the notification.

6. The medium according to claim 2, wherein the programs cause the terminal apparatus to transmit the second file to the predetermined external apparatus which is rebooted, under a condition that communication with the predetermined external apparatus which is rebooted is re-established.

7. The medium according to claim 2, wherein the programs cause the terminal apparatus to be in a state that the terminal apparatus is capable of transmitting the second file, via an operation by a user, to the predetermined external apparatus which is rebooted, under a condition that communication with the predetermined external apparatus which is rebooted is re-established.

8. The medium according to claim 1, wherein in the case that the second file is to be transmitted to the predetermined external apparatus, the programs cause the terminal apparatus to search the predetermined external apparatus from among the external apparatuses.

9. The medium according to claim 8,
wherein in the case that the first file is to be transmitted to the predetermined external apparatus, the programs cause the terminal apparatus to store identification data in a predetermined storing area of the terminal apparatus, the identification data being data for identifying the predetermined external apparatus from among the external apparatuses, and
in the case that the second program is to be transmitted to the predetermined external apparatus, the programs cause the terminal apparatus to search the predetermined external apparatus from among the external apparatuses, based on the identification data stored in the predetermined storage area.

10. The medium according to claim 1, wherein after transmittance of the second file to the predetermined external apparatus has been completed, the programs cause the terminal apparatus to transmit, to the predetermined external apparatus, a reboot instruction for rebooting the predetermined external apparatus.

11. A terminal apparatus configured to transmit files to be executed by external apparatuses to the external apparatuses, the terminal apparatus comprising a processor configured to control communication with the external apparatuses,
wherein the processor is configured to:
transmit a first file, which is a firmware, to a predetermined external apparatus included in the external apparatuses; and
in a case that a second file being different from the first file is to be transmitted to the predetermined external apparatus, transmit the second file to the predetermined external apparatus after transmittance of the first file to the predetermined external apparatus has been completed, the second file indicating information which is usable at a time of execution of a function of the predetermined external apparatus.

12. A data transmitting method executable by a processor of a terminal apparatus so as to transmit files to be executed by external apparatuses from the terminal apparatus to the external apparatuses, the method comprising:
transmitting a first file, which is a firmware, to a predetermined external apparatus included in the plurality of external apparatuses; and
in a case that a second file being different from the first file is to be transmitted to the predetermined external apparatus, transmitting the second file to the predetermined external apparatus after transmittance of the first file to the predetermined external apparatus has been completed, the second file indicating information which is usable at a time of execution of a function of the predetermined external apparatus.

* * * * *